Patented Oct. 31, 1939

2,177,984

UNITED STATES PATENT OFFICE 2,177,984

PHOSPHORIC ACID ESTERS AND METHOD OF PRODUCING THEM

Benjamin R. Harris, Chicago, Ill.

No Drawing. Application February 11, 193. Serial No. 125,272

26 Claims. (Cl. 260—403)

My invention is concerned with new chemical substances in the form of reaction products having the properties of interface modifiers and adapted for use in many industries.

The interface or surface modifying reaction products of my present invention are, in general, prepared by treating a lipophile material having at least one free or esterifiable hydroxy group, and then reacting the resulting lipophile material with a derivative of phosphorus capable of forming an ester of a phosphoric acid.

After much study and research, I have been unable to determine the exact nature of the reaction products which I produce although I am led to believe that they probably contain esters of phosphoric acids. For this reason, I prefer to claim my new reaction products without regard to what their exact structural configuration may be.

The initial step of my process to which I have adverted above, and which I shall describe in detail hereinafter, for some reason, not fully understood, conditions the lipophile material so that it becomes unusually receptive for reaction with the phosphorus-containing compound with which it is subsequently treated. The reaction products, made in accordance with the procedures to be described, have greatly enhanced potency as viscosity reducing agents, particularly for use in confections. The enhancement of other interface modifying functions is also effected and the compounds exert improved properties in the industries in which emulsifying and certain other interface modifying functions are utilized or desired.

I have discovered that, by initially treating a lipophile material containing an esterifiable hydroxy group with soluble acid-reacting sulphate derivatives, I obtain reaction products having excellent surface modifying properties. Among the soluble acid-reacting sulphate derivatives with which I have obtained good results are sodium bisulphate, potassium bisulphate, in other words, alkali metal bisulphates; strong sulphuric acid, preferably concentrated (sp. g. 1.84) sulphur trioxide, fuming sulphuric acid, pyrosulphuric acid, acid-reacting salts of pyrosulphuric acid, and mixtures of any of the above. All of these substances I denote herein as soluble acid-reacting sulphates.

Apart from the above discoveries, I have found that by first employing a relatively small amount of any of the acid reacting sulphates mentioned above and following this by a relatively small proportion of $P_2O_5$ or other similar phosphorus-containing substance, all as a part of the initial step of my procedure, I am also able to obtain excellent results. The initial procedure described above may be reversed, that is, the first treatment may be with the $P_2O_5$ and said treatment finished with the sulphate, and still another alternative is to employ a mixture of $P_2O_5$ and, for example, a bisulphate.

It is accordingly an object of my invention to produce improvements in interface modifying agents.

Another object of my invention is the provision of a new method of preparing said interface modifying agents.

Still another object of my invention is the provision of a relatively inexpensive method of preparing the new interface modifying agents of my present invention.

A further object of my invention resides in the improvement of confections having a fatty constituent by the incorporation therein of the chemical substances of my invention as described hereinafter.

Other objects and features of my invention will be apparent from the following description.

In general, the reaction products of my invention are possessed of at least two groups, one having a hydrophile function and the other having a lipophile function in the molecule. The hydrophile function is performed primarily by a hydrophile phosphorus-containing group, that is, a group containing phosphorus in the form of a phosphorus oxide acid radical, which gives to the molecule as a whole an affinity for aqueous materials. The lipophile portion of the molecule contains at least one lipophile group, that is, a group or radical having a definite affinity for oil and fats. The lipophile radical may be of acyl or alkyl character and may be derived from a fatty acid or a corresponding alcohol. For achieving the most satisfactory results for the purposes which have been set forth herein, the lipophile radical should contain a minimum of six carbon atoms, and, preferably, should contain the higher carbon compounds, particularly those having from twelve to eighteen carbons. The hydrophile phosphorus-containing group should, for my best results, be linked to the lipophile group by means of a polyhydroxy substance, such as sugars, sugar alcohols, glycols, glycerol, polyglycols, polyglycerols, polyhydroxycarboxylic acids of the mono- and poly-basic classes, oxidation products of polyhydroxy substances such as glyceric acid, etc., the nature of which polyhydroxy substance will be referred to more in detail hereinafter. The linkage between the polyhydroxy substance and the lipophile group may be either an ester or an ether linkage, preferably the former. For use in confections, it is preferable, in general, that the molecule as a whole, while containing hydrophile groups, should be predominantly lipophile.

As indicated above, while the exact structural configuration of the compounds of my invention is not known, they are characterized by the fact that they contain phosphorus linked to carbon through oxygen, and particularly efficacious are those where the linkage between the phosphorus-containing group and the lipophile radical takes place through a polyhydroxy substance, especially glycerol. Preferably, particularly for use in foods, the compounds are devoid of groupings wherein nitrogen is linked directly to carbon belonging to radicals in esterified form, as, for example, in choline groups, but by this expression I do not mean to exclude compounds with inorganic ammonium nitrogen and compounds containing nitrogen linked to carbon belonging to cationic, i. e., salt forming radicals which are not in esterified form. Wherever the term "non-nitrogenous" may hereinafter be employed, it will be understood to have this significance.

The lipophile group may include any fatty acid group or relatively high molecular weight organic carboxylic acid group such as the acid radicals of the following acids: caproic, capryllic, capric, hydroxystearic, benzoic, benzoylbenzoic, naphtholic, toluic, palmitic acid, stearic, lauric, melissic, oleic, myristic, ricinoleic, linoleic acid or mixed fatty acids derived from animal or vegetable sources, for example, lard, cocoanut oil, corn oil, cottonseed oil, sardine oil, partially or completely hydrogenated animal and vegetable oils such as cottonseed oil, corn oil, lard, sesame oil and fatty acids of various waxes such as beeswax, spermaceti and carnauba wax or hydro-aromatic acids such as abietic acid, or cycloaliphatic acids such as naphthenic acids, etc., or the lipophile group may be an alkyl radical derived from an alcohol corresponding to any of the preceding acids, such as cetyl alcohol, lauryl alcohol, oleyl alcohol, dodecenol, etc.

Specific examples of polyhydroxy substances, the residues of which may serve as linkages between the lipophile groups and the hydrophile phosphorus-containing groups are as follows: mucic acid, tartaric acid, saccharic acid, gluconic acid, glucuronic acid, gulonic acid, mannonic acid, trihydroxyglutaric acid, glyceric acid, and the like, as well as carboxylic oxidation products of polyglycerols which may be represented by the formulae:

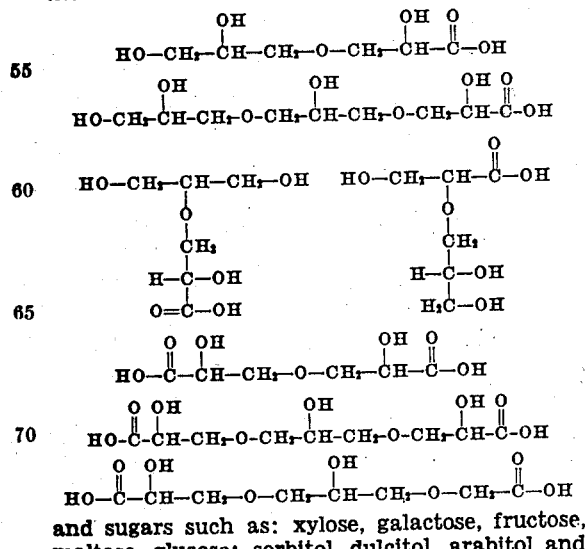

and sugars such as: xylose, galactose, fructose, maltose, glucose; sorbitol, dulcitol, arabitol and other sugar alcohols such as hexahydric alcohols derived from sugars, and other substances having free hydroxy groups; glycerol, polyglycerols, glycols, polyglycols. The above polyglycerols and their oxidation products are produced by polymerizing glycerine, preferably by heating with about 1% of alkali at temperatures from 250° to 260° C. for about three hours in the presence of an inert gas. This reaction mixture will give a mixture of various polyglycerols, the size of the molecules depending upon various factors such as the time of polymerization, etc. The mixtures of polyglycerols are then oxidized with mild oxidizing agents such as hot dilute nitric acid, permanganates, bromine water, etc., to convert at least one of the primary hydroxy groups to a carboxylic group. Preferably, however, the oxidation treatment is applied to the polyglycerol esters or ethers containing free hydroxy groups.

Still other polyhydroxy substances which may be utilized are hydroxy alkyl ethers of polyhydroxy substances such as the following:

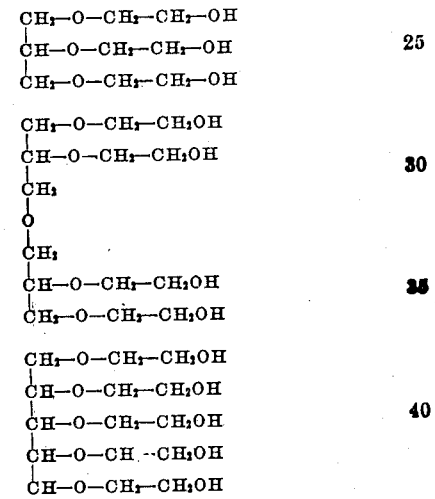

As I have stated previously, I initially subject the lipophile material containing at least one esterifiable hydroxy group to treatment with a soluble acid-reacting sulphate prior to the actual reaction wherein oxygenated phosphorus is introduced into the molecule of the reaction product. This initial treatment comprises subjecting the higher fatty acid or similar ester or ether of the polyhydroxy substance, or other lipophile material containing an esterifiable hydroxy group, to the action of a soluble acid-reacting sulphate as described above, this treatment being preferably carried on at a somewhat higher temperature than the temperature at which the final reaction takes place. For my best results, the initial treatment step and subsequent reaction step are carried out at a temperature not substantially less than 100 degrees C., more particularly, somewhat in excess of 100 degrees C., the preferred range being between approximately 100 degrees C. and 140 degrees C. The initial treating agent or agents is or are removed from the product after the preliminary treatment by suitable means such as filtering, decanting, centrifuging, or the like. For the convenience of those skilled in the art, I shall describe illustrative ways of carrying out my invention, it being understood, of course, that the following examples are given only by way of illustration and are not to be construed as limitative of my invention.

Example A 450 parts of a product consisting essentially of mono-glycerides (made by re-esterification of cottonseed oil, hydrogenated to an iodine value of 65, with a large excess of glycerol, and separating from the excess of glycerol), were admixed with 120 parts of sodium bi-sulphate ($NaHSO_4$), heated, with stirring, to about 120 degrees C., and kept at that temperature for about 20 minutes, the stirring being more or less continuous. When the stirring was stopped, a heavy, syrupy liquid collected rapidly at the bottom, leaving a clear supernatant liquid, the latter being separated by decantation.

380 parts of the decanted liquid obtained above were mixed with 42 parts of finely divided $P_2O_5$ at about 50 degrees C. and the mixture was heated, with stirring, to 105 degrees C. A reaction set in, the temperature rising to 125 degrees C. The reaction mass was then allowed to cool.

(Note: The above process was carried out in the same manner as described above except that, in one instance, 75 parts of sodium bi-sulphate and in another instance 38 parts of sodium bi-sulphate were employed. In each case it was necessary, in the subsequent reaction with $P_2O_5$, to raise the temperature higher than 105 degrees C. before a reaction set in. In the process in which 75 parts of sodium bi-sulphate were employed, it was necessary to raise the temperature to 125 degrees C. after which said temperature rose spontaneously to 140 degrees C. In the process employing 38 parts of sodium bi-sulphate, even when the temperature was raised to 150 degrees C. there was no spontaneous rise in temperature.)

Using lecithin as a standard, viscosity reducing tests were conducted on a standard sweet milk chocolate mix with a somewhat reduced fat content, with the following results:

Product of Example A using 120 parts sodium bi-sulphate_____ 342
Special lecithin_____ 338
Product of Example A using 75 parts sodium bi-sulphate_____ 362
Special lecithin_____ 322
Product of Example A using 38 parts sodium bi-sulphate_____ 406
Special lecithin_____ 342

It will be understood that these values are simply relative, the lower the numerical value the more potent the viscosity reducing agent.

Example B 450 parts of a diglyceride of a higher fatty acid were treated with 60 parts of sodium bi-sulphate at 125 degrees C. for approximately one-half hour. The mass was permitted to settle and a clear liquid decanted.

380 parts of the decanted liquid were reacted with 40 parts of $P_2O_5$ at 50 degrees C. The mixture was heated to about 80 degrees C. after which the temperature spontaneously rose to about 90 degrees C. The reaction mass was then permitted to cool.

Viscosity test:

Product of Example B_____ 406
Special lecithin_____ 332

(Note: The diglyceride was prepared from a mixture of 200 parts of hydrogenated cottonseed oil having an iodine value of 67 and 175 parts of corn oil, this mixture being heated in an atmosphere of $CO_2$ with 110 parts of glycerin and $\frac{1}{10}$ per cent sodium hydroxide (based on the weight of the oil) to 250 degrees C. and kept at that temperature for two hours.)

Example C

The process was carried out in exactly the same manner as in the case of Example B with the exception that in the case of the present example the diglyceride was replaced by a mixture of 50 parts of the monoglyceride prepared in accordance with Example A and 50 parts of diglyceride prepared in accordance with Example B.

Viscosity test:

Product of Example C_____ 340
Special lecithin_____ 336

Example D 450 parts of a monoglyceride, prepared in accordance with Example A, were heated with 43 parts of a mixture consisting of 8 parts of concentrated sulphuric acid (specific gravity 1.84) and 35 parts of sodium bi-sulphate to 125 degrees C. for approximately 20 minutes with rapid stirring. The reaction mass was then allowed to settle and a clear liquid then decanted.

370 parts of the decanted liquid were mixed with 40 parts of finely divided $P_2O_5$ at 50 degrees C. and then heated, with stirring, to 125 degrees C. for several minutes and finally allowed to cool.

Viscosity test:

Product of Example D_____ 400
Special lecithin_____ 336

Example E 450 parts of monoglycerides, prepared in accordance with Example A, were heated with 25 parts of sodium bi-sulphate for twenty minutes at a temperature between 120 degrees and 125 degrees C., with stirring. The mass was allowed to settle, the clear liquid decanted, and said liquid was then mixed with 25 parts of $P_2O_5$ at 50 degrees C. The temperature of this mixture was raised to about 140 degrees C. for several minutes, the mixture being stirred. The stirring was then discontinued and a rubbery-like mass settled out. This was discarded and the clear liquid mass decanted and centrifuged.

380 parts of the clear, centrifuged liquid obtained above were mixed with 42 parts of $P_2O_5$ at 50 degrees C., the temperature then being raised to 65 degrees C. An exothermic reaction set in and the temperature spontaneously rose to 94 degrees C. after which the mass was allowed to cool.

Viscosity test:
Product of Example E_____ 322
Special lecithin_____ 334

Example F

The process was carried out in exactly the same way as in Example E except that 13 parts of $P_2O_5$ were used in the pre-treatment instead of 25 parts. Instead of a rubbery mass settling out as in Example E, a heavy, viscous, syrupy liquid was obtained. In the subsequent reaction process, a rise in temperature of only a few degrees C. spontaneously took place and that occurred only after heating the reaction mixture to 105 degrees C.

Viscosity test:
Product of Example F_____ 324
Special lecithin_____ 334

Example G 450 parts of a monoglyceride, prepared in accordance with Example A, were heated with 13 parts of $P_2O_5$ for 25 minutes at 120 to 125 degrees C., with stirring. The stirring was then discontinued and the mass allowed to settle. The clear liquid was then decanted and mixed with 35 parts of sodium bi-sulphate and heated, with stirring, to 120 to 125 degrees C. for about 20 minutes. It was then permitted to settle and the clear liquid again decanted.

375 parts of the final clear liquid obtained above were mixed with 42 parts of $P_2O_5$ at 50 degrees C. and then heated to 107 degrees C. with stirring. The temperature then spontaneously rose to 130 degrees C. after which the mass was permitted to cool.

Viscosity test:
Product of Example G_____ 324
Product of Example G, neutralized with ammonia _____ 328
Special lecithin_____ 312

Example H 450 parts of a monoglyceride, prepared in accordance with Example A, were treated with 48 parts of a mixture consisting of 35 parts of sodium bi-sulphate and 13 parts of $P_2O_5$, the mass being heated to 120 to 125 degrees C. for about 15 minutes. It was then permitted to settle and the clear liquid decanted therefrom.

About 375 parts of the resulting clear liquid obtained above were mixed with 40 parts of $P_2O_5$ at 50 degrees C., with stirring, and heated to 105 degrees C., after which the temperature spontaneously rose to 130 degrees C. The mass was then allowed to cool.

Viscosity test:
Product of Example H_____ 342
Special lecithin_____ 342

Example I

Carrying out the process in exactly the same way as in Example H except that 50 parts of sodium bi-sulphate were employed instead of 35 parts thereof, the viscosity tests were as follows:

Product of Example I_____ 330
Special lecithin_____ 322

Example J 450 parts of a monoglyceride, prepared in accordance with Example A, were stirred with 15 parts of concentrated sulphuric acid and the mass was heated to 120–125 degrees C. for about 15 minutes. The altered sulphuric acid was allowed to settle and a supernatant liquid was then centrifuged. The clear liquid thus obtained was mixed with 13 parts of $P_2O_5$, stirred, heated to 120 to 125 degrees C. for another 15 minutes and again centrifuged.

380 parts of the final clear liquid obtained from the centrifuged liquid above was mixed with 42 parts of $P_2O_5$ at 50 degrees C. and stirred and heated to 60 degrees C. The temperature spontaneously rose to 100 degrees C. after which the reaction mass was permitted to cool.

Viscosity test:
Product of Example J_____ 294
Special lecithin_____ 314

(Note: A series of products similar to Example J was prepared using 450 parts of the same monoglyceride and the following quantities of sulphuric acid and $P_2O_5$ in the initial step of the process:)

| Sulphuric acid | $P_2O_5$ | Viscosity tests | |
| --- | --- | --- | --- |
| | | Example | Special lecithin |
| 6 | 8 | 332 | 322 |
| 15 | 8 | 300 | 322 |
| 3.8 | 13 | 310 | 318 |
| 4 (fuming, 30 percent $SO_3$) | 13 | 336 | 352 |
| 20 (fuming, 30 percent $SO_3$) | 0 | 376 | 352 |

Example K 740 parts of a monoglyceride, prepared in accordance with Example A, were stirred and heated in a jacketed kettle with 25 parts of concentrated sulphuric acid (specific gravity 1.84) to 115 degrees C. and kept at that temperature for three-quarters of an hour, the mass being stirred meanwhile. A dark red, somewhat syrupy liquid settled quickly to the bottom when the stirring was stopped. This was drawn off and the contents in the kettle were cooled to about 65 degrees C. 10 parts of finely divided $P_2O_5$ were then added, while stirring, to the material still in the kettle and the mixture was then heated to about 118 degrees C. and kept at that temperature for about 25 minutes. The mass was then allowed to settle the altered $P_2O_5$ removed, and the remaining liquid was then centrifuged.

To the clear centrifuged material obtained above, 75 parts of finely divided $P_2O_5$ were added and the mixture was heated to about 82 degrees C. The temperature spontaneously rose to about 105 degrees C. The contents of the kettle were cooled by circulating water in the jacket of the kettle and then the reaction mass was neutralized with sodium carbonate.

The resulting product was a material with a heavy, viscous consistency at room temperature, it had a light brown color, was free of objectionable odor, and like the products described in preceding examples hereinabove, was remarkably potent for the reduction of the viscosity of chocolate, particularly chocolate coating compositions, and possessed useful emulsifying powers, particularly for water-in-oil emulsions.

As I have stated previously, the step of treating with a soluble acid-reacting sulphate somehow or other appears to alter or condition the monoglyceride, diglyceride, or other lipophile material so that it becomes unusually receptive for reaction with the phosphorus-containing compound. The reaction, for example, with $P_2O_5$, subsequent to the initial step of treating with the acid-reacting sulphate, is radically different from what it normally is without said initial step, with the result that the finished product obtained thereby is distinctly more potent for viscosity reduction and is different in many other respects from the product obtained without said initial step. By proceeding in this manner, considerable amounts of phosphorus can be organically combined in the molecule of the reaction product. For example, reaction products containing up to 28% of phosphorus, calculated as $P_2O_5$, have been produced, and it is this phosphorus apparently in the form of a radical comprising oxygenated phosphorus which represents principally, the hydrophile group present in the product.

I have endeavored to ascertain the nature of what takes place as a result of the treatment with the acid-reacting sulphate but thus far have not established the mechanism of the reaction. It may be mentioned that the results described take place regardless of whether the lipophile material such as the monoglyceride, diglyceride, or the like be pure or impure. I have purified a monoglyceride by repeatedly washing it with hot water and, in some cases brine, to remove unreacted glycerin and other soluble material which might be contained therein and have then dried it. When subjected to the treatment with a soluble acid-reacting sulphate in accordance with my invention, some material, the nature of which I have been unable fully to ascertain, appears to adhere to the sulphate and separates out therewith. This occurs whether the lipophile material is pure or impure or represents a single chemical compound or a mixture of chemical compounds.

While all of the substances of my invention fall into the category of interface modifiers, obviously they differ, respectively, in their suitability for specific interfaces, and they modify interfaces in various ways and to various extents, depending upon the character and relative potencies of the hydrophile and lipophile groups, the resultant of the two representing the interfacial function of the molecule as a whole and depending, also, on the character of the interface.

It should not be inferred that the final reaction products of my invention need be derived from single or pure substances. Indeed, in practice, it is frequently more convenient to prepare a mixture of substances from which my reaction products are produced and to use such in the final reaction mixture. For example, I may prepare a mixture of monoglycerides or diglycerides of higher fatty acids or mixtures of such monoglycerides and diglycerides by any convenient method and then introduce into this mixture of monoglycerides and/or diglycerides an oxygenated phosphorus radical in the manner described above. It will be appreciated that my process is applicable to the treatment of single, pure lipophile chemical compounds having at least one free hydroxy group or to mixtures of such materials whether pure or containing proportions of impurities.

The reactions with phosphorus pentoxide described hereinabove are susceptible to considerable variation as to the proportion of phosphorus pentoxide used, the fineness thereof, the temperature, and the duration of contact between the fatty material and the phosphorus pentoxide. In general, each of these four factors stands in reciprocal relation to the other two, that is to say, other things being equal, the greater the proportion of phosphorus pentoxide, the shorter the time of contact and/or the lower the temperature of reaction required to obtain a given result. Similarly, if the phosphorus pentoxide is relatively very finely divided, the amount thereof, the time and temperature of heating may all be reduced. Or, to state another reciprocal relation, the higher the temperature of reaction, other things being equal, the coarser may be the $P_2O_5$, the shorter the duration of contact and/or the lower the proportion of phosphorus pentoxide required to obtain a given result.

However, these reciprocal relations are valid generally only within certain reasonable limits. For example, while at temperatures below 105 degrees C. some reaction does occur, it is very slow, so that to get appreciable interface modifying potency in the product, the time of contact would be so long and the proportion of phosphorus pentoxide required so high as to make such a procedure extremely inconvenient in many instances.

On the other hand, the employment of temperatures substantially higher than 140 degrees C. in general tends to reduce the potency of the product and discolor and char it, especially so when higher proportions of phosphorus pentoxide or longer times of contact are employed. The temperature factor is particularly important in relation to the phosphorus pentoxide reaction because of the fact that this reaction is decidedly exothermic. It is evident, therefore, that while considerable latitude is permissible in the proportion of phosphorus pentoxide, in the temperature range of the reaction, and in the time of contact of phosphorus pentoxide with fatty material, certain criteria as to the interrelationship of these three factors must be observed to secure high interface modifying potencies in the product obtained.

Notwithstanding this, however, even though the reaction be subjected to considerable, even indiscriminate, variation in the three factors indicated, the products obtained will still possess interface modifying properties such as those described herein. To be sure, in order to obtain high or outstanding potency with respect to such interface modifying properties, those skilled in the art will appreciate the importance of carefully adjusting the conditions of the reaction, particularly with respect to the three factors designated. An illustration of such preferred conditions is carefully specified hereinabove in Example K. In all cases, however, the products obtained comprise reaction products interfacially active in fatty compositions falling into the class with which the present invention deals and the determinants of which are referred to at various points of this specification.

The physical properties of the product, such as color and consistency, depend a great deal upon the starting material. The solubility or dispersibility in oils and fats also varies with the relationship of the lipophile group to the hydrophile phosphate group. The more potent materials produce noticeable interfacial effects in proportions as small as ¼ to ½%. Examples of the more or less lipophile materials possessing at least one hydroxy group reactive to phosphorus pentoxide, which are suitable for the purposes of my invention, in addition to those already mentioned herein, are as follows:

Mono fatty acid esters of ethylene glycol, mono fatty acid esters of diethylene glycol, mono fatty acid esters of glycerine, fatty acid esters of polyglycerols with at least one hydroxy group reactive to phosphorus pentoxide, cetyl glycerol ether, lauryl ethylene glycol ether, myristyl diethylene glycol ether, other alkyl ethers with at least one hydroxy group reactive to phosphorus pentoxide, and other more or less lipophile substances with at least one hydroxy group reactive to phosphorus pentoxide. All of these materials give reaction products with phosphorus pentoxide possessing marked interfacial activity of the kind discussed at great length hereinabove, making them very valuable as addition agents in confections and the like.

My interface modifiers may be dried or further purified, decolorized or deodorized, or diluted by incorporation of oils or fats, or otherwise treated. The neutralization of the reaction products of my invention in general seems to impart definite improvements in potency, stability, color, consistency, etc. The unneutralized product, sometimes of a dark brown color, becomes lighter when treated with a neutralizing agent, a dark brown product usually attaining a straw color. Indeed, the color may be taken as an index in carrying out the neutralizing step. Usually the product becomes less fluid when neutralized or partially neutralized and is generally somewhat better for some purposes.

It should be understood that the reaction conditions described generally in the foregoing part of the specification and more specifically in the various examples hereinabove may be varied as to temperature, time, proportion and kind of reacting materials, and for each set of conditions, a corresponding potency is obtained.

In each of the examples given above, the acid-reacting sulphate, apparently in a somewhat altered form, is removed by centrifuging. Other adaptable and suitable methods of removal conventionally employed in the chemical industries for separation processes may be used.

In the light of what has been disclosed hereinabove, it is evident that, coupled with the initial treatment with a soluble acid-reacting sulphate, there are several methods by means of which the materials of my invention may be made. The method employed should be determined primarily by considering the type of substance to be produced. In introducing the oxygenated phosphorus radical, for example, a material containing as esterifiable hydroxy group is reacted with phosphorus pentoxide, pyrophosphoric acid, meta-phosphoric acid, phosphorus halides, ethyl meta-phosphate, phosphorus trioxides, phosphorus pentachloride, phosphorus oxychloride, or some other reagent capable of furnishing the elements required for the formation of an oxygenated phosphoric acid. Either one or more oxygenated phosphorus radicals may be introduced, depending upon the substance desired. A condensing agent and/or a solvent may be added where required.

Throughout this specification, I have employed the term "lipophile" to designate organic radicals with fatty characteristics. In general, such radicals consist primarily of carbon and hydrogen, although they may and preferably do include ether and/or ester linkages or other oxygen-containing groups. I have employed this term "lipophile" to denote that the radical so designated has a distinct affinity for hydrocarbons, oils, fats, waxes and other fatty materials, and imparts a tendency to the molecule, of which it is a part, to be wetted by fatty materials.

I have employed the term "hydrophile" throughout this specification primarily to denote properties antithetical to the "lipophile". In counter-distinction to the "lipophile" radicals, the "hydrophile" radicals consist primarily of hydrogen and oxygen and the "hydrophile" characteristics are imparted primarily by hydroxy groups attached to carbon or phosphorus. The hydrophillic character manifests itself by an affinity for water and aqueous media, and the hydrophile radical imparts to the molecule, of which it is a member, a tendency to be wetted by water and aqueous media. The degree or extent of the hydrophillic character is dependent upon the number of hydroxy groups and their location in the molecule, and is also influenced by the number and character of lipophile groups with which they are associated in the molecule.

The polyhydroxy substances which are the linking substances between the lipophile group or groups and the hydrophile phosphate group or groups may be conveniently considered as falling into two groups. The first of these groups includes compounds containing less than four esterifiably hydroxy groups and is exemplified by glycerine, glycol and polyglycols. The second group contains those substances which have more than three esterifiable hydroxy groups, examples of which are the sugars and sugar alcohols, the polyglycerols such as di- and tri-glycerol, etc. It will be understood that my compounds may have one or more lipophile radicals and one or more hydrophile oxygenated phosphorus radicals attached to the polyhydroxy substance. Thus, for example, I may have the mono-oxygenated phosphorus derivative of the di-oleic acid ester of sucrose, or the di-oxygenated phosphorus derivative of the di-oleic acid ester of sucrose. Similarly, I may have the mono- or di-oxygenated phosphorus derivative of the di-stearic or other fatty acid ester of di- or tri-glycerol. In a similar way, as described above, instead of the acyl derivatives of the polyhydroxy substances I produce the corresponding alkyl derivatives.

As I have described above, my compounds may contain either ester or ether linkages. Any known methods of etherifying polyhydroxy substances may be employed. The following examples are illustrative:

*Example L*

Sodium octylate

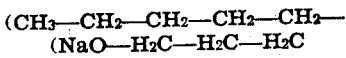

is treated with a 25% molal excess of glycerine alpha bromhydrin. The mixture is heated under reflux with exclusion of moisture and with stirring until the anticipated amount of sodium bromide has formed. The sodium bromide is filtered out of the hot reaction mixture and the product, namely, glycerol alpha octyl ether, is separated from the excess mono bromhydrin by fractional distillation under reduced pressure. The ether is treated as described above and subsequently reacted with phosphorus pentoxide or other phosphorus-containing compounds capable of forming a phosphoric acid ester.

*Example M*

Potassium cetylate ($CH_3$—($CH_2$)$_{14}$—$CH_2$—$OK$) is reacted with excess ethylene glycol chlorhydrin by the procedure described in Example L, to form the glycol mono octyl ether. This is treated and then finally reacted, as described hereinabove, to form an oxygenated phosphorus derivative of cetyl glycol ether. This may be neutralized with ammonia or some other alkaline or potentially alkaline material to give salts of the cetyl glycol ether derivative.

Many of the products described hereinabove are very valuable as interface modifiers in confections such as chocolate mixes intended as coverings for cakes, candies and the like. In employing my interface modifiers in products such as confections, it will be understood that the character of the improvement effected by the introduction of such interface modifiers naturally varies with the composition at hand and to some extent also with the particular reaction products employed.

The improvement in chocolate and confectionery batches and similar substances is not entirely a matter of viscosity reduction. For example, in a conventional chocolate mix such as one containing 148 parts of powdered sugar (6-X cane sugar), 52 parts of cocoa powder (12% fat content), 100 parts of cocoa butter and flavoring, the principal improvement is a substantial reduction in viscosity. In a confection such as toffee consisting, for example, of 60 parts of cocoanut stearine, 140 parts of 4-X cane sugar, 20 parts of invert sugar, and 20 parts of water, wherein the mix is boiled at about 285 degrees F., and the fat must emulsify and remain emulsified at this relatively high temperature, the improvement is largely one in the ease of the emulsification and the stability of the emulsion obtained. In still other preparations, additional improvements are found such as the character of texture, appearance and/or flavor; but it is to be noted that, in every instance, whatever the character of the improvement at hand, the physical-chemical mechanism is one of interface modification effected by the character of the interface modifiers which I describe herein.

The amount of interface modifying agent employed in, for example, the confection, though subject to considerable latitude, will ordinarily vary between approximately one-fourth per cent and three per cent, depending upon the nature of the product, the function desired, and the character of the reaction product used.

As one example of the advantages obtained from the use of my invention, a conventional chocolate mix may be considered. One hundred parts of a given chocolate mix composition were found to require about 83 seconds at 43 degrees C. to pass through a given orifice. In making a test of this character, the mix is milled warm according to the usual custom for about 15 minutes and then allowed to cool to about 43 degrees C., at which temperature the test is made. About one-quarter per cent of one of the reaction products of my invention, prepared, for instance, as in Example E, when added to such a mix and thoroughly dispersed therethrough, will reduce the time of flow to 38 seconds, all conditions remaining the same.

The reduction of viscosity, of course, may be taken advantage of in various ways and may also be taken advantage of in various ways and may also be employed for the purpose of economizing in the proportion of fat used. That is to say, a given viscosity may be obtained, other things being equal, with a substantially smaller proportion of the fat ingredient, when a reaction product of the kind described herein is incorporated in the mixture.

The most desirable manier of incorporating the interface modifiers of my invention in the case of, for example, confections, is to dissolve them in the fat content of the confection in which they are used. The usual fats employed are cocoa buter, so-called pressed butter, cocoanut stearine, dairy butter, hydrogenated oils and other oils, fats and fatty materials.

As applied to use in confections, the invention has been considered from the standpoint of reduction in viscosity, but, as indicated above, many other improvements manifest themselves in various forms to those skilled in the art to which the invention relates. For example, the improvements effected make possible lower enrobing temperatures; they make possible longer cooling periods, thereby permitting longer time out of tunnels; a greater range of working temperatures on the enrobing machine is possible; tempering is more uniform and gradual; in the cooking of toffees, by virtue of the fact that a far superior and a much more stable emulsion is obtained, the cooking is more flexible and tolerates considerably more abuse and variation than heretofore, without detrimental effects on the ultimate product; the tendency to "blooming" is considerably diminished and delayed. In many instances additional desired characteristics inure to the products concerned, by virtue of the diminished fat content. For a more complete disclosure of the use of interface modifiers in confections, reference may be had to U. S. Patents Nos. 1,859,240 and 2,025,986.

A valuable feature of many of the reaction products of my present invention is that they can be produced in the form of a substantially impalpable powder, and are, therefore, conveniently and readily incorporated into products of the character described. For example, many of the reaction products of my invention may be sprayed into a cold atmosphere whereby the finely divided material of the spray is congealed and takes substantially a powder-like form. Still other ways of producing the reaction products in a convenient and desirable condition for use can be used.

The invention, as it applies to confections and confection-like materials, is of value under any circumstances in which a comminuted material such as sugar, cocoa powder, powdered milk, powdered egg whites, or other powdered or finely divided material is dispersed in a fatty material.

While I have described several methods for the preparation of the reaction products of my invention, it must be understood that the scope of the invented class of said products is by no means limited by these methods. Modifications of said methods may be used. This also applies, and particularly so, to supplementary procedures of purification or isolation which lie strictly within the province of skill of any qualified chemist whose procedures in each instance must be governed by the properties of the reaction products concerned and by the degree or the character of the purity desired.

Similarly, in the neutralization of the reaction products, considerable latitude and modification may be employed. While the reaction products may be left unneutralized, I find that, in general, the products are more suited to the purpose for which they are intended if they are treated with a suitable inorganic or organic anti-acid agent. Examples of inorganic and organic anti-acid agents which may be used satisfactorily are bicarbonates, potassium hydroxide, potassium carbonate, metallic sodium, sodium hydroxide, sodium carbonate, sodium oxide, ammonium hydroxide, ammonia gas, and other anti-acid materials of the alkaline earth group, potentially alkaline materials such as sodium stearate, calcium stearate, sodium acetate, sodium ethylate, etc.; in the case of products not intended for use in foods, pyridine, piperidine, aniline, d'methylaniline, quinoline, etc., and ethanolamines, such as mono-, di-, and triethanolamine, or mixtures thereof; and also other anti-acid materials, in which case the hydrogen of the oxygenated phosphorus group or groups is replaced by a cation such as sodium, potassium, ammonium, calcium, magnesium, aluminum, zinc, etc. It will be understood that by the term "cation", as used throughout the specification and claims, is meant such elements as are mentioned herein and, in general, atoms or radicals which are regarded as bearing a positive charge and which are capable of replacing an acidic hydrogen.

Whenever the term "polyhydroxy substance" is used in the specification and claims, it will be understood to cover substances having at least two esterifiable or etherifiable hydroxy groups independently of any carboxylic groups which may be present in the same molecule.

The term "residue", as used throughout the specification and claims, is employed in its ordinarily understood chemical significance. For example, where one of the hydroxyl groups of glycerine is esterified with a fatty acid or etherified with an alcohol, and another of the hydroxyl groups of the glycerine is reacted with P₂O₅ or the like, that which remains of the glycerine molecule, for example,

is the "residue" of the polyhydroxy substance, in this case glycerine.

Wherever the term "higher" is employed in the claims, it will be understood to mean at least six carbon atoms unless otherwise specifically stated.

What I claim as new and desire to protect by Letters Patent of the United States is:

1. The process of preparing new reaction products which comprises subjecting a lipophile material, selected from the group consisting of higher molecular aliphatic ethers and esters of polyhydroxy substances, the higher molecular radical of which contains at least six carbon atoms, said lipophile material having at least one free hydroxy group directly attached to the polyhydroxy nucleus, to treatment with a soluble, acid-reacting sulphate whereby said lipophile material is "conditioned" without effecting any appreciable organic combination of the acid-reacting sulphate with said lipophile material, physically removing said acid-reacting sulphate and adhering material and then reacting the remaining lipophile material with a derivative of phosphorus capable of forming an ester of a phosphoric acid.

2. The process of preparing new reaction products which comprises subjecting a lipophile material, selected from the group consisting of higher molecular weight aliphatic ethers and esters of polyhydroxy substances, the higher molecular weight radical of which contains at least six carbon atoms, said lipophile material having at least one free hydroxy group directly attached to the polyhydroxy nucleus, to treatment with a soluble, acid-reacting sulphate whereby said lipophile material is "conditioned" without effecting any appreciable organic combination of the acid-reacting sulphate with said lipophile material, physically removing said acid-reacting sulphate and adhering material, and then reacting the remaining material with phosphorus pentoxide.

3. The process of claim 2, wherein the soluble, acid-reacting sulphate includes a member of the group consisting of alkali metal bisulphates, strong sulphuric acid, sulphur-trioxide, pyrosulphuric acid, acid-reacting salts of pyrosulphuric acid, and mixtures thereof.

4. The process of claim 2, wherein the reaction product is neutralized at least in part.

5. The process of claim 2, wherein the lipophile material is a higher fatty acid ester of a polyhydroxy substance of the group consisting of glycerol, glycol, polyglycerols, polyglycols, sugars, sugar alcohols, and polyhydroxy-carboxylic acids.

6. A process of preparing new reaction products which comprises subjecting a lipophile material, selected from the group consisting of higher molecular weight aliphatic ethers and esters of polyhydroxy substances, the higher molecular weight radical of which contains at least six carbon atoms, said lipophile material having at least one free hydroxy group directly attached to the polyhydroxy nucleus, at a temperature of at least about 100 degrees C. but below the temperature of decomposition of the reactants or the finished product, to treatment with a soluble, acid-reacting sulphate whereby said lipophile material is "conditioned" without effecting any appreciable organic combination of the acid-reacting sulphate with said lipophile material, physically removing said acid-reacting sulphate and adhering material, and then reacting the remaining lipophile material with a derivative of phosphorus capable of forming an ester of a phosphoric acid.

7. The process of claim 6, wherein the soluble, acid-reacting sulphate includes a member of the group consisting of alkali metal bisulphates, strong sulphuric acid, sulphur trioxide, pyrosulphuric acid, acid-reacting salts of pyrosulphuric acid, and mixtures thereof.

8. The process of claim 6, wherein the lipophile material is a higher fatty acid ester of a polyhydroxy substance of the class consisting of glycerol, glycol, polyglycerols, polyglycols, sugars, sugar alcohols, and polyhydroxycarboxylic acids.

9. The process of preparing new reaction products which comprises subjecting a higher fatty acid ester of glycerin having at least one free glycerin hydroxy group, the higher fatty acid radical of said ester containing at least six carbon atoms, to treatment with a soluble, acid-reacting sulphate at a temperature of at least 100 degrees C. but below the temperature of decomposition of the reacting ingredients or the finished product, whereby said ester is "conditioned" without effecting any appreciable organic combination of the acid-reacting sulphate with said ester, physically removing said acid-reacting sulphate and adhering material, and reacting the remaining product with a derivative of phosphorus capable of forming an ester of a phosphoric acid.

10. The process of claim 9, wherein the derivative of phosphorus is phosphorus pentoxide.

11. The process of preparing new reaction products which comprises subjecting unsaturated higher fatty acid esters of glycerin containing at least one free glycerin hydroxy group, the higher fatty acid radical of said ester containing at least six carbon atoms, to treatment with a soluble, acid-reacting sulphate whereby said esters are "conditioned" without effecting any appreciable organic combination of the acid-reacting sulphate with said esters, physically removing said acid-reacting sulphate and adhering material and then reacting the remaining product with phosphorus pentoxide.

12. The process of preparing new reaction products from a mixture of mono- and di-glycerides resulting from the re-esterification of cottonseed oil with glycerin, which comprises subjecting said mixture of mono- and di-glycerides, at elevated temperatures, to treatment with a soluble, acid-reacting sulphate whereby said mixture of mono- and di-glycerides is "conditioned" without effecting any appreciable organic combination of the acid-reacting sulphate with said mono- and di-glycerides, physically removing said acid-reacting sulphate and adhering material, and thereafter introducing phosphorus pentoxide into the remaining product and reacting the resulting mixture at an elevated temperature.

13. The process of preparing new reaction products which comprises subjecting normally liquid vegetable oil fatty acid esters of glycerin containing at least one free glycerin hydroxy group to treatment with a soluble, acid-reacting sulphate at elevated temperatures whereby said esters are "conditioned" without effecting any appreciable organic combination of the acid-reacting sulphate with said esters, physically removing said sulphate and adhering material, then introducing into the remaining product a derivative of phosphorus capable of forming an ester of a phosphoric acid, and reacting the resulting mixture.

14. The process of preparing new reaction products which comprises contacting an ester of the class consisting of higher fatty acid monoglycerides, higher fatty acid diglycerides, and mixtures thereof, the higher fatty acid radical of which contains at least six carbon atoms, with a minor proportion of an acid-reacting sulphate of the group consisting of alkali metal bisulphates, strong sulphuric acid, sulphur trioxide, pyrosulphuric acid, acid-reacting salts of pyrosulphuric acid, and mixtures thereof, at a temperature of at least 100 degrees C., whereby said ester is "conditioned" without effecting any appreciable organic combination of the acid-reacting sulphate with said ester, physically removing said sulphate and adhering material, and then introducing phosphorus pentoxide into the remaining material and reacting the mixture at a temperature of at least 80 degrees C.

15. The process of preparing new reaction products which comprises contacting a higher fatty acid ester of glycerin having at least one free glycerin hydroxy group, the higher fatty acid radical of said ester containing at least six carbon atoms, with a minor proportion of an acid reacting sulphate of the group consisting of alkali metal bisulphates, strong sulphuric acid, sulphur trioxide, pyrosulphuric acid, acid-reacting salts of pyrosulphuric acid, and mixtures thereof, at a temperature in excess of 100 degrees C., whereby said ester is "conditioned" without effecting any appreciable organic combination of the acid-reacting sulphate with said ester, physically removing said acid-reacting sulphate and adhering material, and reacting the remaining product with a minor proportion of phosphorus pentoxide at an elevated temperature, and then treating the reacted product with a neutralizing agent to decrease the acidity of the resulting reaction product.

16. The process of preparing new reaction products which comprises contacting a product consisting primarily of monoglyceride, and prepared by re-esterification of cottonseed oil hydrogenated to an iodine value of approximately 65 with a large excess of glycerol, at a temperature between approximately 100 degrees C. and 140 degrees C. for at least fifteen minutes, with a relatively small amount of a soluble, acid-reacting sulphate whereby said monoglyceride is "conditioned" without effecting any appreciable organic combination of said acid-reacting sulphate with said monoglyceride, physically removing said acid-reacting sulphate and adhering material, and then reacting the remaining monoglyceride product with a relatively small amount of phosphorus pentoxide, said reaction being carried out at a temperature not substantially less than 100 degrees C.

17. The process of claim 16, wherein the sulphate is a member of the group consisting of alkali metal bisulphates, strong sulphuric acid, sulphur trioxide, pyrosulphuric acid, acid-reacting salts of pyrosulphuric acid, and mixtures thereof.

18. The process of preparing new reaction products which comprises subjecting a higher fatty acid ester of a polyhydroxy substance, the higher fatty acid radical of said ester containing at least six carbon atoms, said ester containing at least one free hydroxy group attached to the polyhydroxy nucleus, to treatment, at a temperature between approximately 100 degrees C. and 140 degrees C. for at least fifteen minutes, with a relatively small amount of a soluble, acid-reacting sulphate whereby said ester is "conditioned" without effecting any appreciable organic combination of the acid-reacting sulphate with said ester, physically removing said acid-reacting sulphate and adhering material, and then reacting the remaining ester with a derivative of phosphorus capable of forming an ester of a phosphoric acid.

19. The process of preparing new reaction products which comprises subjecting a lipophile material, selected from the group consisting of higher molecular weight aliphatic ethers and esters of polyhydroxy substances, the higher molecular weight radical of which contains at least six carbon atoms, said lipophile material having at least one free hydroxy group, at elevated temperatures, to treatment with a relatively small amount of phosphorus pentoxide and a soluble, acid-reacting sulphate, whereby said lipophile material is "conditioned" without effecting any appreciable organic combination of the phosphorus pentoxide or acid-reacting sulphate with said lipophile material, physically removing said phosphorus pentoxide, sulphate and adhering material from the lipophile material, and then reacting the remaining lipophile material with a derivative of phosphorus capable of forming an ester of a phosphoric acid.

20. The process of claim 19, wherein the lipophile material is a fatty acid ester of a polyhydroxy substance, which ester contains at least one free hydroxy group attached to the polyhydroxy nucleus, the fatty acid radical of said ester containing between 12 and 18 carbon atoms, and wherein the derivative of phosphorus is phosphorus pentoxide.

21. Reaction products formed by subjecting a lipophile material, selected from the group consisting of higher molecular weight aliphatic esters and ethers of polyhydroxy substances, the higher molecular radical of which contains at least six carbon atoms, said lipophile material having at least one free hydroxyl group directly attached to the polyhydroxy nucleus, to treatment with a soluble, acid-reacting sulphate, whereby said lipophile material is "conditioned" without effecting any appreciable organic combination of the acid-reacting sulphate with said lipophile material, physically removing said sulphate and adhering material, and then reacting the remaining lipophile material with a derivative of phosphorus capable of forming an ester of phosphoric acid.

22. Reaction products formed by subjecting lipophile material, selected from the group consisting of higher molecular weight aliphatic ethers and esters of polyhydroxy substances, the higher molecular weight radical of which contains at least six carbon atoms, said lipophile material having at least one free hydroxyl group directly attached to the polyhydroxy nucleus, to treatment with a soluble, acid-reacting sulphate selected from the group consisting of alkali metal bisulphate, strong sulphuric acid, sulphur trioxide, pyrosulphuric acid, acid-reacting salts of pyrosulphuric acid, and mixtures thereof, whereby said lipophile material is "conditioned" without effecting any appreciable organic combination of the acid-reacting sulphate with said lipophile material, physically removing said acid-reacting sulphate and adhering material, and then reacting the remaining lipophile material with phosphorus pentoxide.

23. The product of claim 22, wherein the lipophile material is a higher fatty acid ester of a polyhydroxy substance of the group consisting of glycols, glycerol, polyglycols, polyglycerols, sugars, sugar alcohols, and polyhydroxycarboxylic acids.

24. Reaction products formed by contacting a higher fatty acid ester of glycerin having at least one free glycerin hydroxy group, the higher fatty acid radical of said ester containing at least six carbon atoms, with a soluble, acid-reacting sulphate at a temperature of at least 100 degrees C. but below the temperature of decomposition of the reacting ingredients or the finished product, whereby said ester is "conditioned" without effecting any appreciable organic combination of the acid-reacting sulphate with said ester, physically removing said sulphate and adhering material, and reacting the remaining product with phosphorus pentoxide.

25. Reaction products formed by contacting an ester of the class consisting of higher fatty acid mono-glycerides, higher fatty acid diglycerides, and mixtures thereof, the higher fatty acid radical of said monoglycerides and diglycerides having at least six carbon atoms, with a minor proportion of an acid-reacting sulphate of the group consisting of alkali metal bisulphate, strong sulphuric acid, sulphur trioxide, pyrosulphuric acid, acid-reacting salts of pyrosulphuric acid, and mixtures thereof, at a temperature of at least 100 degrees C., whereby said ester is "conditioned" without effecting any appreciable organic combination of the acid-reacting sulphate with said ester, physically removing said sulphate and adhering material, and then introducing phosphorus pentoxide into the remaining product and reacting the mixture at a temperature of at least 80 degrees C.

26. Reaction products formed by contacting a product, consisting primarily of monoglycerides and prepared by re-esterification of cottonseed oil hydrogenated to an iodine value of approximately 65 with a large excess of glycerol, with a relatively small amount of a soluble, acid-reacting sulphate, at a temperature between approximately 100 degrees C. and 140 degrees C. for at least fifteen minutes, whereby said monoglycerides are "conditioned" without effecting any appreciable organic combination of the acid-reacting sulphate with said monoglycerides, physically removing said sulphate and adhering material, and then reacting the remaining monoglyceride product with a relatively small amount of phosphorus pentoxide at a temperature not substantially less than 100 degrees C.

BENJAMIN R. HARRIS.